United States Patent
Makinen et al.

(10) Patent No.: US 9,342,924 B2
(45) Date of Patent: *May 17, 2016

(54) CONSERVATIVE CELL AND PORTAL GRAPH GENERATION

(71) Applicant: Umbra Software Ltd., Helsinki (FI)

(72) Inventors: Otso Makinen, Helsinki (FI); Hannu Saransaari, Helsinki (FI)

(73) Assignee: UMBRA SOFTWARE LTD., Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,158

(22) Filed: Feb. 12, 2015

(65) Prior Publication Data

US 2015/0154791 A1    Jun. 4, 2015

Related U.S. Application Data

(62) Division of application No. 13/569,879, filed on Aug. 8, 2012, now Pat. No. 8,988,431.

(51) Int. Cl.
  *G06T 15/08* (2011.01)
  *G06T 15/40* (2011.01)
  *G06T 17/00* (2006.01)
  *G06T 11/20* (2006.01)

(52) U.S. Cl.
  CPC ............. *G06T 15/08* (2013.01); *G06T 11/206* (2013.01); *G06T 15/40* (2013.01); *G06T 17/005* (2013.01)

(58) Field of Classification Search
  CPC ......... G06T 15/40; G06T 15/20; G06T 15/08; G06T 15/06; G06T 15/005; G06T 1/20
  See application file for complete search history.

(56) References Cited

U.S. PATENT DOCUMENTS

2002/0190995 A1    12/2002    Lim
2014/0043331 A1    2/2014    Makinen et al.

OTHER PUBLICATIONS

Lefebvre et al., Automatic cell-and-portal decomposition, INRIA ISSN 0249-6399, Aug. 1, 2003, downloaded on Sep. 13, 2015 from http://www-ljk.imag.fr/Publications/Basilic/com.lmc.publi.PUBLI_Techreport@1172c0fd434_91669a/lefebvre-hornus-portals.pdf.*

Hsieh et al.; "A Flexible 3D Slicer for Voxelization using Graphics Hardware"; GRAPHITE '05 Procceedings of the 3rd International Conference on Computer Graphics and Interactive Techniques in Australasia and South East Asia; pp. 285-288; 2005.

Haumont et al.; "Volumetric Cell-and-Portal Generation"; EUROGRAPHICS; 2003.

* cited by examiner

*Primary Examiner* — Haixia Du

(74) *Attorney, Agent, or Firm* — Patterson + Sheridan, LLP

(57) ABSTRACT

Embodiments presented herein provide techniques for creating and simplifying a cell and portal graph. The simplified cell and portal graph may be used to make a conservative determination of whether an element of geometry is visible for a given view frustum (and therefore needs to be rendered). That is, the simplified cell and portal graph retains the encoded visibility for given set of geometry. The simplified cell and portal graph provides a "conservative" determination of visibility as it may indicate that some objects are visible that are not (resulting in unneeded rendering), but not the other way around. Further, this approach allows cell and portal graphs to be generated dynamically, allowing the cell and portal graphs to be used for scenes where the geometry can change (e.g., as 3D world of a video game).

21 Claims, 12 Drawing Sheets

CONSERVATIVE CELL AND PORTAL GRAPH GENERATION

CROSS-REFERENCE TO RELATED APPLICATION

This application is a divisional of co-pending U.S. patent application Ser. No. 13/569,879, filed Aug. 8, 2012. The aforementioned related patent application is herein incorporated by reference in its entirety.

BACKGROUND

1. Field of Invention

Embodiments of the present invention generally relate to building a cell and portal graph corresponding to two-dimensional (2D) or three-dimensional (3D) graphics data. More specifically, embodiments of the invention relate to techniques for generating a data structure that encodes conservative occlusion information for the graphics data. i.e., the cell and portal graph.

2. Description of the Related Art

Rendering is the process of generating an image from a model in a database that contains information concerning the scene such as object definitions, lighting, texture and possibly other properties. This information is passed along to a computer program which assembles this information into a raster graphics image. The more complex a scene, the more resource intensive rendering operations become. To offload some of this computational load, Graphic Processing Units (GPU) were developed to assist the CPU in performing the complex rendering operations present in graphic intensive programs such as computer gaming. The two techniques used for three dimensional (3D) graphic rendering are pre-rendering and real-time.

Real-time rendering of computer graphics has at least three performance goals: to generate more frames per second, at a higher resolution, and to display more objects in a scene. Rendering is a resource intensive operation and performance can be optimized by rendering the least amount of objects possible. This is done by rendering only those objects which are necessary to be visible in a scene. Culling is the process of removing items from a group based on specific criteria. In computer graphics, a selection of scenes that are not visible from a user perspective is removed from the computer rendering process through the method of culling. Computer programmer's use culling to determine what parts of a rendering operation can be skipped to enhance performance. The rendering of geometry elements can therefore be culled by determining the visibility of those elements within a view frustum.

Some techniques of culling include: Back Face Culling where Faces that face away from the camera are not drawn; View frustum Culling where objects are culled if they are outside the view frustum; Portal Culling that divides the scene into cells with portals between them for rendering; Detail Culling that decreases the amount of details based on distance; and Occlusion Culling where geometry that is occluded by other geometry is not rendered. All these techniques can be costly to the Graphics Processing Unit (GPU). Also, culling techniques require a great deal of manual labor for a programmer to place culling tiles in the scene in order for objects to be culled. Another solution is to use a Z-buffer and sort graphics geometry in a front to back order. Although only the object closest to the user is rendered in Z-buffering, all objects still go through the pipeline.

SUMMARY

One embodiment of the invention provides a computer-implemented method for generating a cell and portal graph corresponding to graphics data. This method may generally include voxelizing the graphics data, generating an initial cell and portal graph for the voxelized graphics data, and simplifying the initial cell and portal graph. The operation to simplify the cell and portal graph includes, repeatedly, selecting a first cell in the initial cell and portal graph and growing the first cell in the initial cell and portal graph by merging cells neighboring the first cell until the first cell cannot be grown further without exceeding a specified measure of occlusion.

In a particular embodiment, voxels that do not intersect geometry in the graphics data are marked as empty and voxels that intersect geometry in the graphics data are marked as solid. Further, the initial cell and portal graph is generated by identifying an initial plurality of cells by flood-filling empty voxels in the voxelized graphics data to group neighboring voxels together up to an initial cell size parameter. Portals are identified between the initial plurality of cells, by testing whether voxels assigned to one cell in the initial plurality of cells have a neighbor voxel assigned to another cell in the initial plurality of cells.

In another particular embodiment, the growing of the first cell in the initial cell and portal graph is performed by merging the cells neighboring the first cell, until the first cell cannot be grown further without exceeding a specified measure of occlusion. The occlusion is measured by casting, between the first cell and a cell neighboring the first cell, a specified plurality of rays between points on portals of the first cell and points on portals of the cell neighboring the first cell. Occlusion by a solid voxel is determined for each ray. A percentage of occluded rays relative to the specified plurality of rays are then determined. Upon determining the percentage of occluded rays is below the specified measure of occlusion, merging the first cell and the cell neighboring the first cell.

Other embodiments include, without limitation, a computer-readable medium that includes instructions that enable a processing unit to implement one or more embodiments of the disclosed methods as well as a system configured to implement one or more embodiments of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note however, the appended drawings illustrate only typical embodiments of this invention and are therefore not limiting, for the invention may admit to other equally effective embodiments.

DETAILED DESCRIPTION

Figure 1:
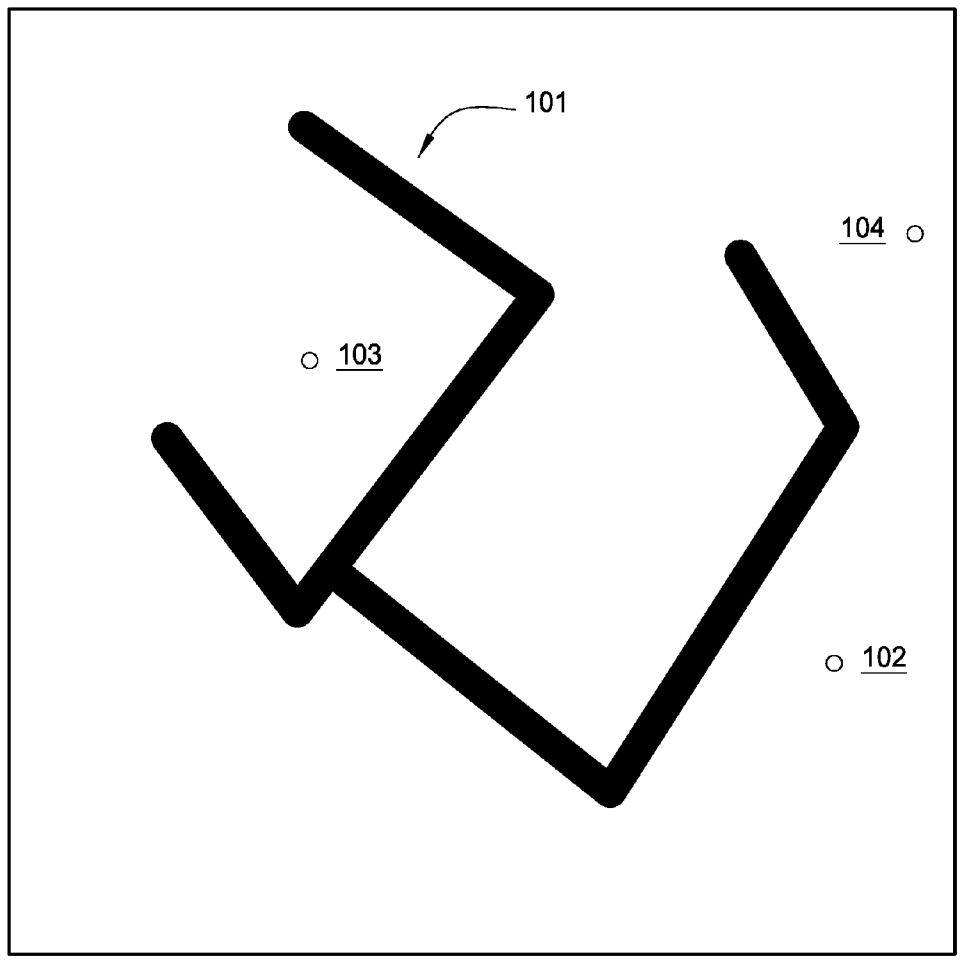
FIG. 1 illustrates a 2D geometry, according to one embodiment of the invention.

Embodiments presented herein provide techniques for efficiently creating a cell and portal graph for a corresponding set of graphics data. A cell and portal graph provides a data structure used to encode the visibility of a scene. Each cell corresponds to a number of pixels in two dimensions or three dimensions, referred to as a voxel. Voxels that intersect geometry of the graphics data are referred to as being solid (i.e., visibility is occluded by the geometry) or empty (i.e., visibility is not occluded by the geometry). Neighboring cells are tested for visibility and grouped together based on the ability to see the cells within the cell group. However, for a complex scene, a cell and portal graph can become very large, making then inadequate for some rendering processes.

One embodiment provides a method to build a cell and portal graph. The method may be executed early in the rendering pipeline to build the cell and portal graph. The method reduces very large data structures into a more manageable size without significant loss of information. Such a data structure can be used to determine object visibility at later stages in a rendering operation. Objects not visible in a view frustum of a camera are culled from the rendering operation. In addition to being used for occlusion culling during rendering, the cell and portal graph can be used for a variety of other processes. For example, visual and sound occlusion, or physics calculations.

In one embodiment, cells are generated by voxelizing a set of graphics data. Empty voxels adjacent to other empty voxels are grouped together into a cell based on an initial cell size parameter. The cell is then grouped with neighboring cells based on the visibility of a cell within the group. Cells exhibiting a threshold amount of occlusion are placed in a second cell group. The actual threshold amount can be determined as a matter of preference. The grouping continues until all cells are assigned to a cell groups.

Cells are grouped together based on visibility sampling. The resulting visibility sampling is used to create a cell and portal graph. To group cells, a random empty cell is assigned to a new cell group. The new cell group is expanded in each direction by a test of occlusion with an ungrouped neighboring cell. The ungrouped neighboring cell is evaluated for inclusion in the cell group by selecting two random portal test points on outgoing portals. One test point resides on the exterior portal of the cell group and the second test point resides on the exterior portal of the ungrouped neighboring cell. The test for occlusion between the selected points is performed by traversing rays through the cell graph from the first point to the second point. A ray is considered to be occluded when the first random portal test point is not visible to the second random portal test point. After repeating this process for a large number of rays, a value for the amount of occlusion between the candidate cells can be determined. In one embodiment, the value is computed by multiplying the area of the portals with the ratio of occluded rays.

Ungrouped neighboring cells are placed into the cell group until such time that the occlusion value exceeds a threshold parameter. The cell group is finalized when the cell group can no longer be expanded in any direction. This approach iteratively builds a cell and portal graph, while only minimally degrading the accuracy of scene visibility encoded by the cell and portal graph. As a result, the cell and portal graph can fit in a smaller memory space and can be queried rapidly, allowing it to be used in real time rendering.

Users may specify a variety of parameters to control characteristics of a cell and portal graph generated using the techniques disclosed herein. For example, a "feature size" parameter is used to determine an amount of geometry that is occluded. A "smallest hole" parameter specifies an initial voxel size. The "smallest hole" parameter controls the granularity of the cell and portal graph. An "initial cell size" parameter specifies a size of the cell, which influences the runtime and the memory usage when generating the cell and portal graph. The smallest hole parameter and the initial cell size parameters are related. The cell size, determined by the "initial cell size" parameter, is a number of voxels, which was determined by the "smallest hole" parameter. Voxels are initially grouped into cells of the "initial cell size" dimensions by flood filling the voxelized geometry. Initial portals are generated along a cell axis aligned boundary box (AABB) after determining a neighboring voxel belongs to a different cell. An oriented boundary box (OBB) may be used as an alternative.

The following discussion presents a variety of embodiments. However, the invention is not limited to the specifically described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Note, embodiments are generally described herein relative to an approach for generating a cell and portal graph for a set of two-dimensional (2D) graphics data. However, one of ordinary skill in the art will recognize that this approach for generating a cell and portal graph may readily be used with three-dimensional (3D) graphics data. For example, a game engine on a video game could use a cell and portal graph to perform occlusion culling prior to rendering frames for video game in real time. Further, a simplified cell and portal graph could also be used for other purposes by a game engine. For example, an artificial intelligence subsystem could use visibility of characters determined by the cell and portal graph to control non-player character behavior. Similarly, the game engine could use the cell and portal graph to create audio effects based on the "visibility" of one cell of an object making noise in another cell.

FIG. 1 illustrates an example set of 2D geometry 101. As shown, 2D geometry 101 includes a set of connected linear segments. As described in greater detail below, a simplified cell and portal graph may encode the visibility between a collection of cells and portals constructed relative to geometry 101. For example, such a cell and portal graph would indicate that location 103 was not visible to location 102, as it is occluded by part of the 2D geometry 101. Conversely, such a cell and portal graph would indicate that region 102 was generally visible to location 104.

Figure 2:
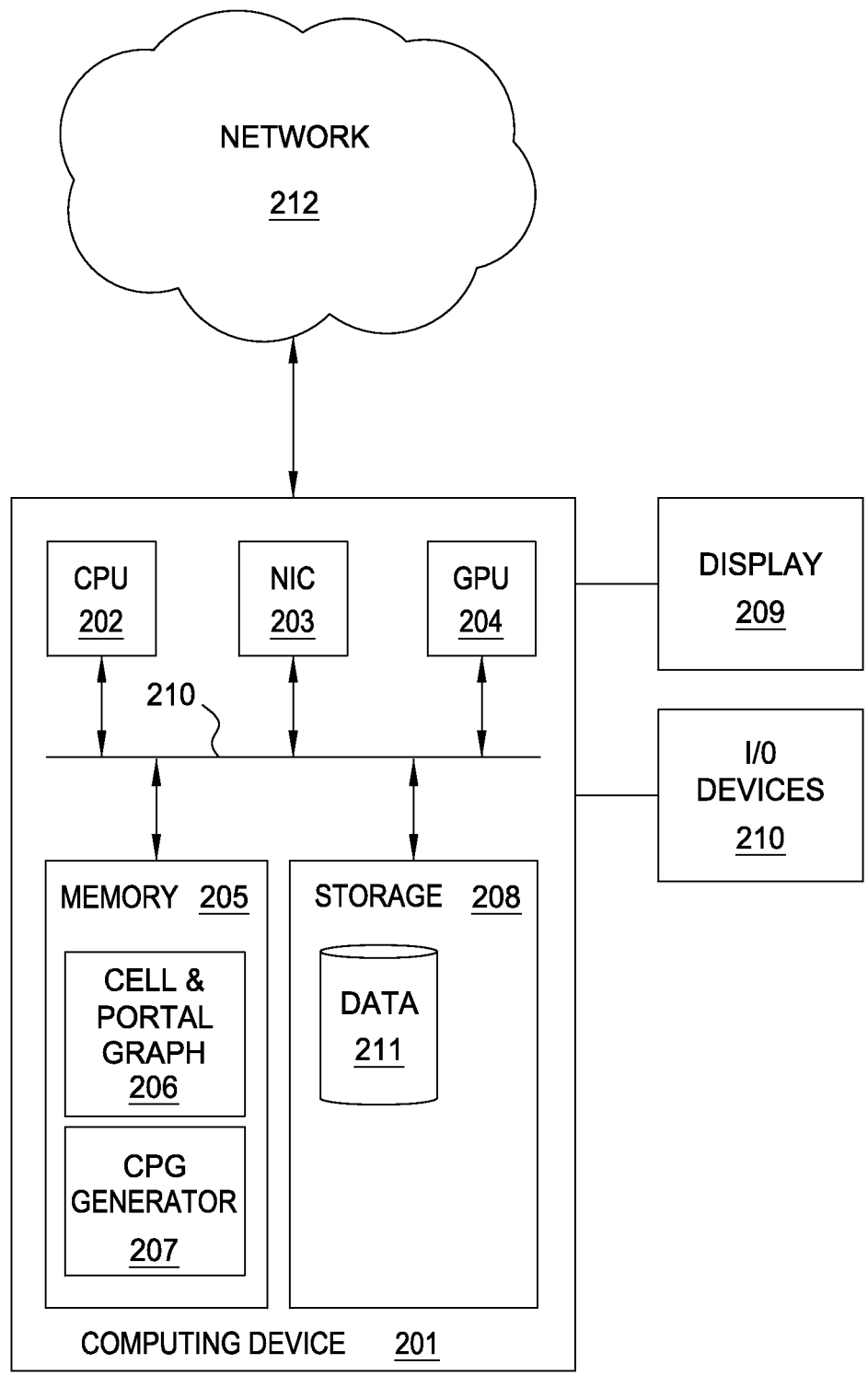
FIG. 2 illustrates an example computing device, according to one embodiment of the invention.

FIG. 2 illustrates an example of a computing device, according to one embodiment of the invention. As shown, the computing device 201 includes a CPU (central processing unit) 202, a NIC (network interface card) 203, a GPU (graphical processing unit) 204, a memory 205, a storage 208, and a bus 210. The computing device 201 is connected to a network 212, and a display 209, and an input/output (I/O) device 210. The computing device 201 is included to be representative of a variety of computing systems, including, e.g., a desktop computer, a laptop computer, a tablet, a phone, a console game system, or variety of other computing devices capable of rendering graphics data.

The rendered graphics may be viewed on the display device 209, e.g., an LCD, LED or CRT monitor and controlled using input devices 210, e.g., a keyboard, mouse and/or a controller.

CPU 202 and GPU 204 are programmable logic devices that execute instructions, logic and mathematical processing, and may be representative of one or more CPUs multi-core CPUs, and/or GPUs, and the like. The memory 205 represents any memory sufficiently large to hold the CPG Generator 207 and the data structures associated with the cell and portal graph 206 while executing a given program. Memory 205 could be one or a combination of memory devices, including Random Access Memory (e.g., DRAM modules), nonvolatile or backup memory (e.g., programmable or Flash memories, read-only memories, etc.). Storage 208 stores application programs and graphics data 211 for use by the CPG generator 207. Storage 208 is included to be representative of hard-disk drives, solid-state drives (SSD), flash memory devices, optical media (e.g., CD/DVD/Blu-Ray® discs) and the like. In one embodiment, the CPG generator 207 receives 3D geometry for which a cell and portal graph is to be generated. In one embodiment, the CPG generator 207 creates the cell and portal graph 206 from a set of graphic data. The cell and portal graph 206 is used by the GPU 204 to provide efficient queries for occlusion culling of graphics on the display 209.

Figure 3:
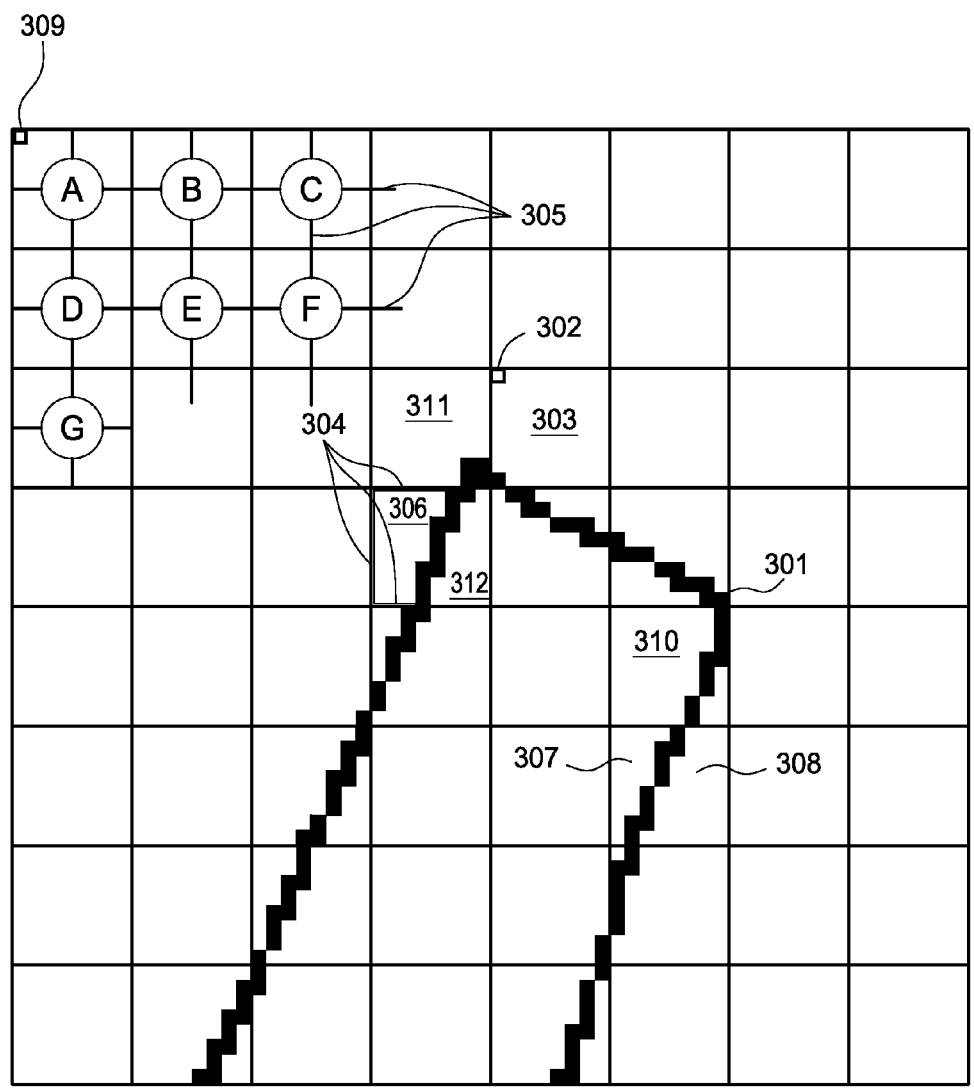
FIG. 3 illustrates a cell and portal graph, according to one embodiment of the invention.

FIG. 3 illustrates a 2D plane 300 generated along with a set of voxelized 2D geometry 301, according to one embodiment. As shown, the 2D geometry is voxelized by determining each voxel in the 2D plane 300 that intersects the 2D geometry 301. Intersecting voxels are filled in and presumed to obstruct visibility between cells when generating the cell and portal graph. Voxels that do not intersect the 2D geometry, e.g., voxels 302 and 309, are presumed to not obstruct visibility between neighboring cells.

In one embodiment, cells are generated in the 2D plane by flood filing. Each cell corresponds to a contiguous set of voxels, up to a maximum cell size. To do so, an initial voxel is selected (e.g., at random or at a predetermined starting point in the geometry), and neighboring voxels are added to the cell until reaching maximum cell size or intersecting geometry or other cells. Note, while the selection of a different initial point (or points) to begin flood filling may result in somewhat different cells, depending on the geometry, the ultimate visibility between points in the graphics data as encoded in the cell and portal graph remains generally the same.

Assume voxel 309 is selected to begin the flood filling process. In such a case, flood filling from voxel 309 results in cells A, B, C, D, E, F, and G, etc., being generated with the maximum cell size. However, the flood filling of cell 306 intersects the geometry 301 and the bordering cells prior to reaching the maximum cell size. Similarly, cells 307 and 308 are created on different sides of the 2D geometry. Once the cells are defined, portals between cells may be identified. For example, cell A has a portal to cell B and cell D, as cell A has voxels along a boundary with each of these cells. Similarly, cell B has a portal to cells A, C, and E. However, cell 307 does not have a portal to cell 308 because the voxelized geometry 301 obstructs cells 307 and 308 from one another. Similarly, cell 306 has a portal 304 to the cell 311 directly above, to the cell directly to the left, and to the cell below portal 304, but not to cell 312 on the other side of the voxelized geometry 301.

Once the cells are created, a cell and portal graph may be generated encoding the visibility between cells. For example, a cell and portal graph generated for 2D plane 300 and voxelized 2D geometry 301 would indicate that cell 311 was visible from 306 (as well as indicating that cells A-G were visible to cell 306). In contrast, such a cell and portal graph would indicate that cells 307 and 308 (among others) were not visible from cell 306. Given the combinatoric possibilities, a complete cell and portal graph for even the relatively simple 2D geometry 301 shown in FIG. 3 can be quite large. And for a complex 3D scene, a cell and portal graph can easily require gigabytes of storage space, making it generally unusable for real time rendering operations.

Accordingly, embodiments of the invention provide an approach for creating and simplifying a cell and portal graph. The simplified cell and portal graph may be used to make a conservative determination of whether an element of geometry is visible for a given view frustum (and therefore needs to be rendered). That is, the simplified cell and portal graph retains the encoded visibility for given set of geometry. The simplified cell and portal graph is said to provide a "conservative" determination of visibility as it may indicate that some objects are visible that are not (resulting in unneeded rendering), but not the other way around. That is, the simplified cell and portal graph should not provide any false positive determinations of visibility incorrectly indicating that an object is not visible. Further, the approach allows cell and portal graphs to be generated dynamically, allowing the cell and portal graphs to be used for scenes where the geometry can change (e.g., as 3D world of a video game).

In the cell and portal graph, nodes correspond to cells and portals correspond to edges. The visibility between two nodes can be determined by evaluating whether a path between the nodes is present in the graph. The cell and portal graph can be used to determine which cells are visible from a given viewpoint of view frustum, whether a ray passes between cell A and cell B, and the topological distance between two points.

Figure 4:
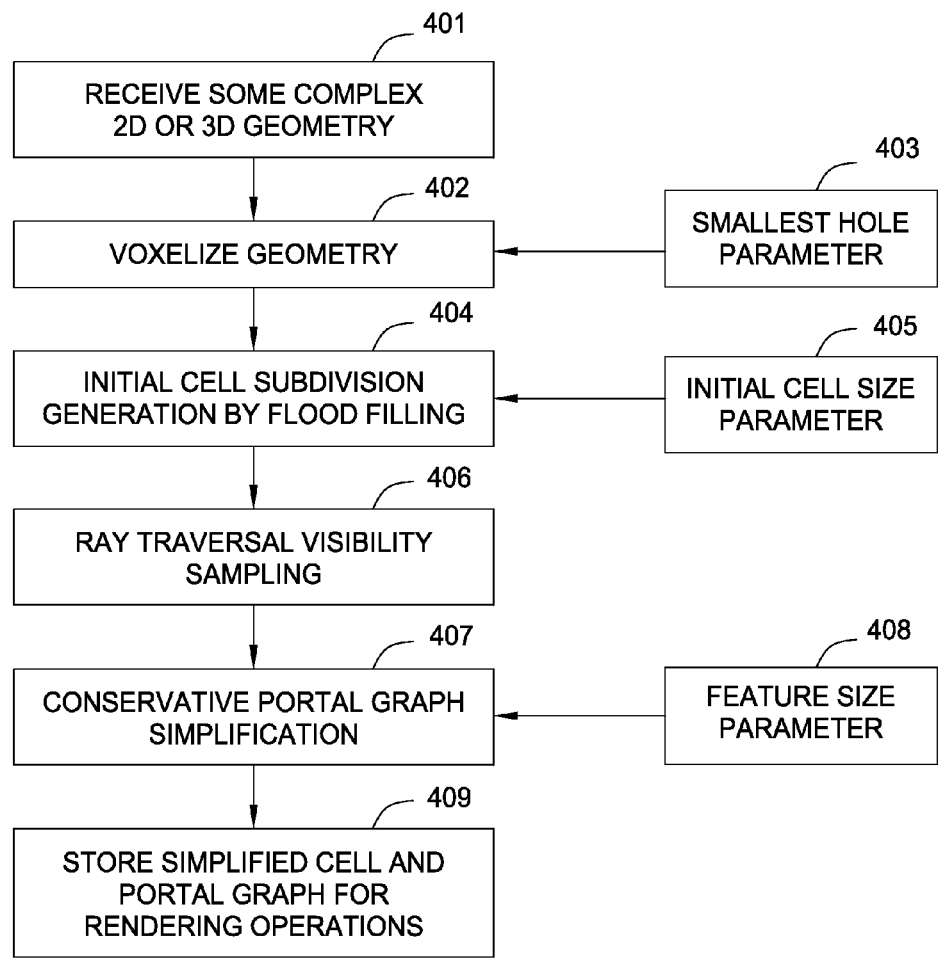
FIG. 4 illustrates a method for building a cell and portal graph, according to one embodiment of the invention.

FIG. 4 illustrates a method 400 for building a cell and portal graph, according to one embodiment of the invention. The method 400 method begins at step 401, where the CPG generation component receives a set of scene geometry. As noted, the scene geometry can include 2D (e.g., a set of points, lines, and/or curves) or 3D geometry (an arbitrary collection of triangles or polygons in a 3D coordinate space).

At step 402, the scene geometry received at step 401 is voxelized. For 2D scene geometry, a voxel is typically a square group of points in the scene geometry. For 3D geometry a voxel is a cube of points within the scene geometry. Voxels are tagged as either solid or empty, based on whether a voxel intersects with the geometry or empty space. In one embodiment, a "smallest hole" parameter 403 defines the voxel size. The voxel size or "smallest hole" directly controls the tolerated error level and the required preprocessing time. Smaller voxel sizes reduce errors in cell graph at the cost of preprocessing time.

At step 404, the CPG generator 207 creates an initial cell and portal graph. In one embodiment, the initial cell and portal graph may be defined by subdividing the voxelized geometry into an axis-aligned grid. The initial grid node size corresponds to the initial cell size. When determining the initial cell size, the initial grid node size is chosen to match the granularity at which to sample scene occlusion features. An initial cell size parameter 405 sets the cell side length used to determine the maximum number of voxels permitted. For example, the cells may be created by flood filling 404 empty voxels neighboring other empty voxels until an initial cell size is reached. The cell size is the limit of the axis aligned bounding box corresponding to an initial cell size parameter 405. Cells may be smaller than the initial cell size parameter 405 in cases where voxelized scene geometry graphics data splits a cell.

The CPG generator 207 uses ray traversal visibility sampling (step 406) to check for occlusion. Step 406 is further illustrated in FIG. 5. The rays generated at step 406 are used to measure visibility occlusion between cells. A ray is sent between a random point on the cell group's portal and a random point on a neighboring cell to determine visibility between the two random points. For example, for a current cells group "A" and a neighboring cell "B", the candidate cell group is the combination of "A-B". Rays are cast between two random points on portals leading out from the candidate cell group "A+B". The sample rays test for the percentage of the rays, which enter and exit the candidate cell group "A+B", that are blocked by geometry inside the candidate cell group "A+B". If the percentage is below a prescribed threshold, the candidate cell group "A+B" is accepted as a new cell group. The threshold is defined by the total area of outgoing portals and the feature size parameter.

Conservative portal graph simplification (step 407) is performed based on the number of occluded rays. A nearest neighbor cell can be added to the cell group in cases where the number of occluded rays relative to the total number of rays generated between the cell group and the nearest neighbor cell remains below a threshold value. If the number of occluded rays, again relative to the total rays cast, exceeds the threshold, then the nearest neighbor cell is not added to the cell group. A feature size parameter 408 may control the aggressiveness of the conservative portal graph simplification in step 407. More specifically, the feature size parameter 408 controls the size of features ignored for occlusion in the conservative graph simplification of step 407. For example, if the feature size is 10 feet (in the world space of the scene geometry), occlusion resulting from objects smaller than 10 feet are removed in the conservative portal graph simplification (step 407). At step 409, the simplified cell and portal graph is stored for use in rendering (and other) operations.

Figure 5:
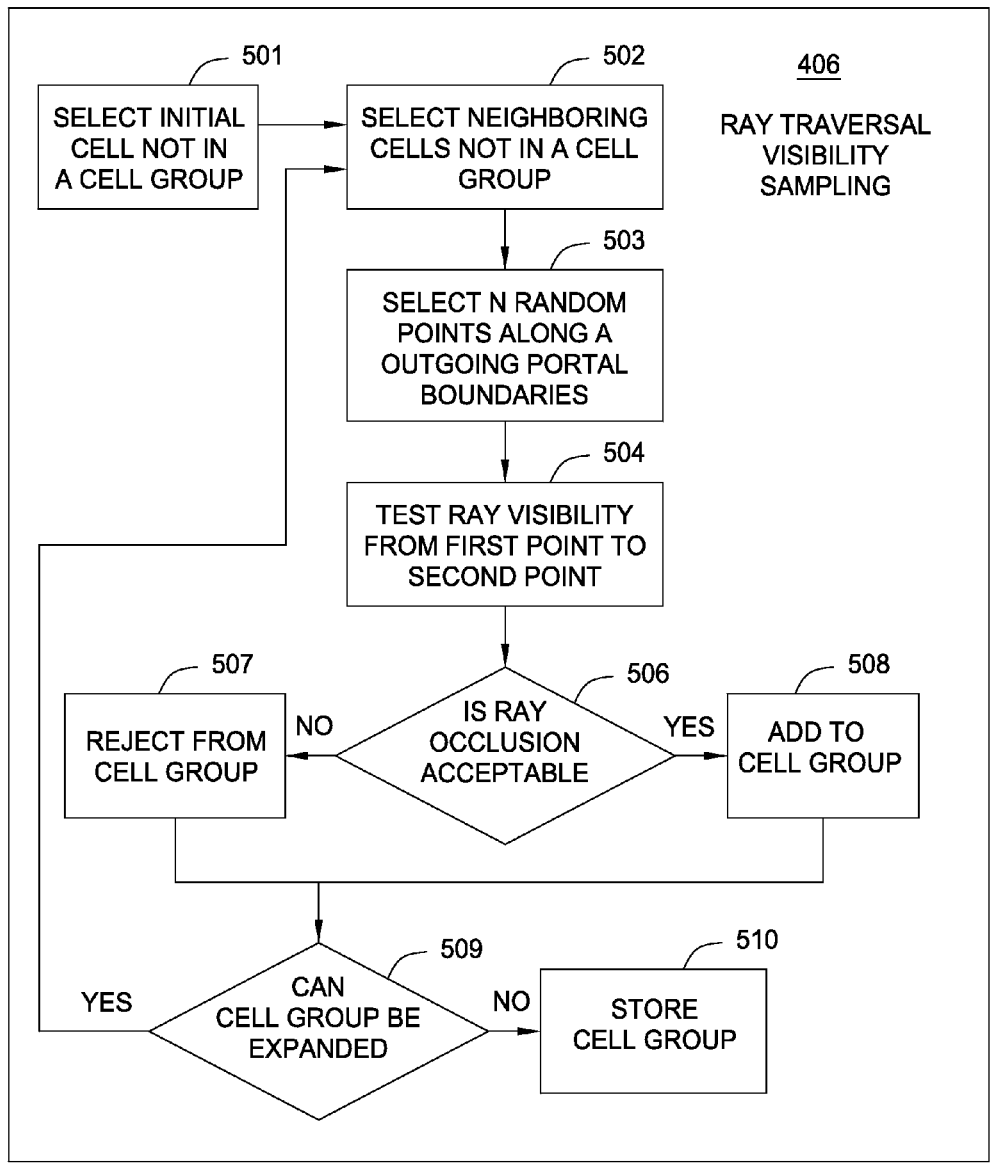
FIG. 5 illustrates a method of ray traversal visibility sampling, according to one embodiment of the invention.

FIG. 5 illustrates a method of ray traversal visibility sampling, according to one embodiment. Method 500 illustrates an example of operations performed as part of step 406 of method 400.

As shown, the method begins at step 501, where an initial cell is selected to start a cell group. At step 502, an attempt to expand the cell group is performed on a plurality of neighboring cells in each direction in the cell grid one row at a time. For example, the CPG generator 207 sample the plurality of neighboring cells on random points on outgoing portals of the cell group in step 503. Portals between the cell group and the neighboring cells are ignored. At step 504, rays are cast by traversing the initial cell graph into neighboring cell portals. For example, the CPG generator casts rays between two points in the sample point set, where one point is on the cell group portal and the second point is on the a neighboring cell portal, to test for occlusion. If the random point is visible to the ray, then the ray is not occluded. At step 506, the CPG generator 207 measures an amount of occlusion inside the candidate set. In one embodiment, a measure of occlusion is determined by the amount of occlusion the plurality of neighboring cells would lose. The random rays that otherwise would be blocked in the neighboring cells, will not be blocked because the candidate cell group was accepted as a new "larger" cell. The newly simplified cell graph can be guaranteed to have good occlusion properties by only accepting the new candidate cell sets that don't lose too much occlusion. A value of the measure of occlusion is computed by multiplying the area of outgoing portals with the ratio of occluded rays (step 506). If this value is greater than a user-specified value, the cell is not added to the cell group (step 507), otherwise the plurality of neighboring cells are added to the cell group and the interior portals are removed (step 508). The CPG generator determines whether the cell group can be further expanded and whether to try another direction (step 509). If the cell group cannot be further expanded in any direction, the cell group is finalized and metadata for this group is recorded (step 510). If the cell group can be expanded in a next direction, a new plurality of neighboring cells is chosen in each direction to test for occlusion (step 502).

FIGS. 6-11 provide an example of a simplified cell and portal graph generated according to the methods of FIGS. 4 and 5. In this example, the geometry of FIG. 1 is first voxelized and then used to create cell portal graph.

Figure 6:
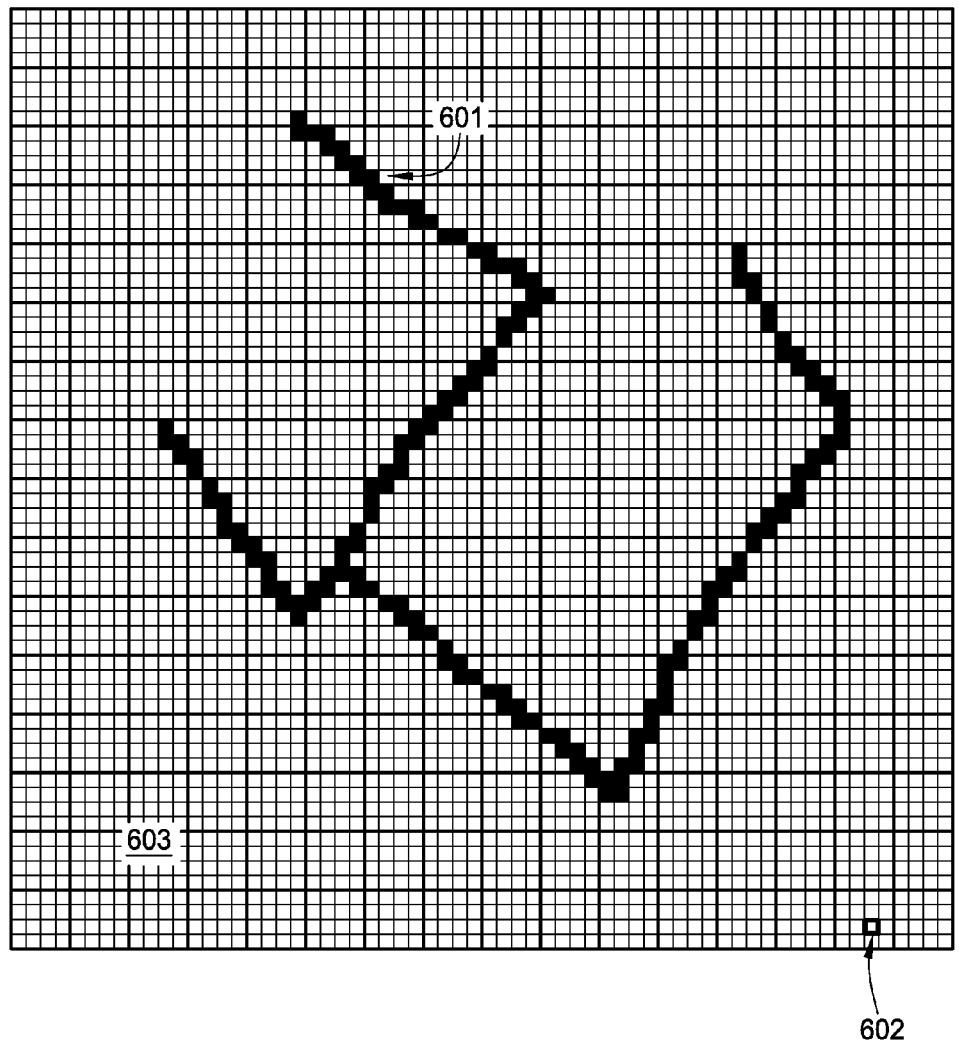
FIG. 6 illustrates an example voxelization of 2D geometry, according to one embodiment of the invention.

FIG. 6 illustrates a voxelization of the 2D geometry 101 presented in FIG. 1. As shown, scene data 603 illustrates the vector graphic 2D geometry 101 after being voxelized. A voxel 602 is the smallest unit of the scene data 603. The voxelization converts 2D geometry 101, or a 3D geometry, into a data structure where each dot is represented by a voxel 602 and each voxel is either solid or empty. As noted above, a "smallest hole" parameter may specify the size of a voxel (e.g., voxel 602). For example, the voxels intersecting scene geometry correspond to voxelized scene geometry 601— shown using solid squares (i.e., voxels) are solid. In contrast, empty voxels (e.g., voxel 602) do not intersect elements of the 2d geometry.

Figure 7:
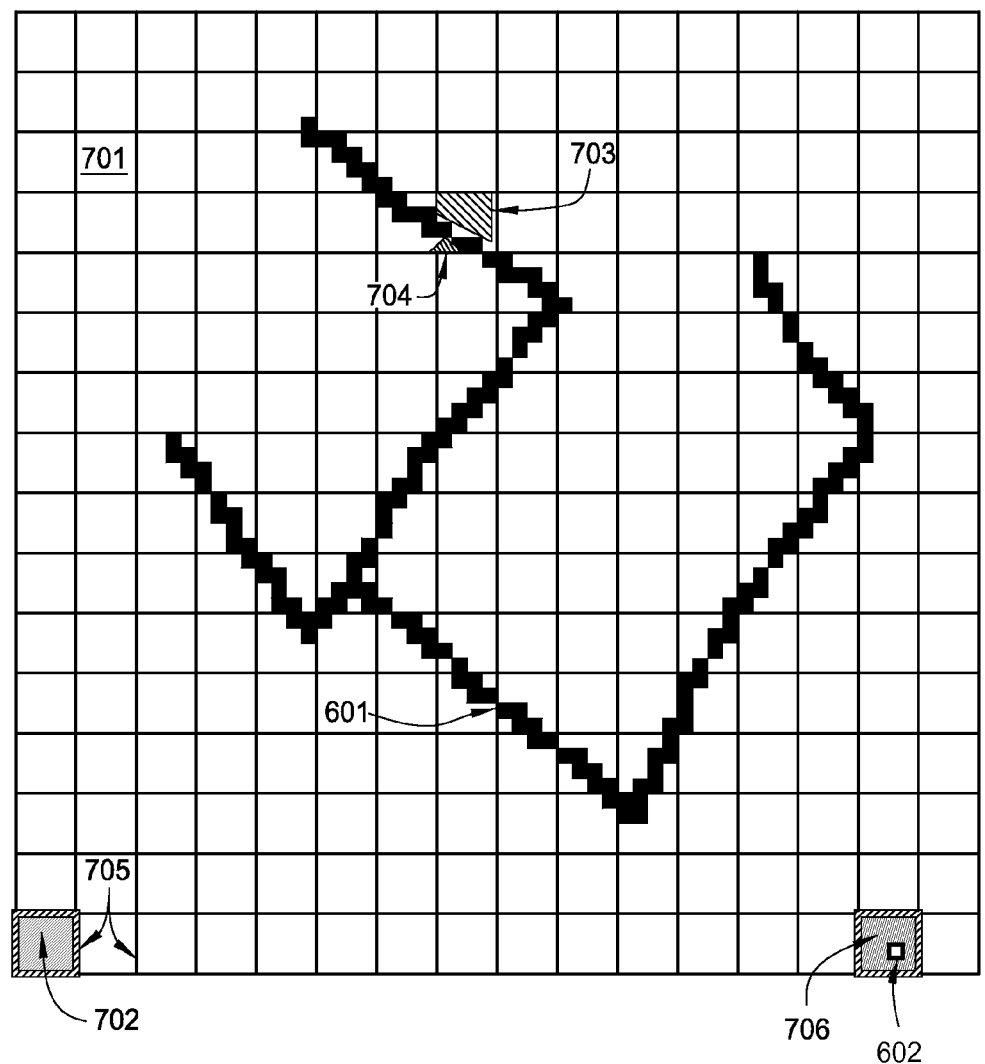
FIG. 7 illustrates flood filling of voxelized geometry to create cells, according to one embodiment of the invention.

FIG. 7 illustrates an example voxel 602 grouped into a cell 706, according to one embodiment. As shown, voxels of the voxelize scene geometry 601 are not part of the cell 703 but are part of the scene 701. Cell 703 has a boundary shared with the voxelized scene geometry 601 but a portal (such as portal 705) does not exist between them. The cell 702 perimeters, which are shared with other cells, are portals 705. Cells 704 and 703 do not share a common boundary with each other as the graphic image 601 is not part of a cell. Therefore a portal does not exist on cell 704 or 703 along the graphic image 601. That is, in this example there is no visibility from cell 703 to 704.

During the cell generation of FIG. 7, a dense cell graph is produced. In a three dimensional case, an octree is split until a node size is smaller than smallest hole or until there are no solid triangles intersecting a node. If a leaf node contains a solid triangle, it is called a solid voxel. Otherwise it is referred to as an empty voxel. For each subtree in the octree that is of a size "cell size parameter," all empty voxels are flood-filled using fast neighbor finding in the octree recursively. A cell is generated for each connected regions and cell reference is added to the voxel. For all empty voxel, all empty neighboring voxels are visited. If the neighboring voxel belongs to different cell, a portal is added between them.

Additionally, metadata may be generated for each cell. The metadata contains information concerning the axis-aligned bounding box (AABB) of empty voxels for each cell. However, in another embodiment an oriented bounding box (OBB) may be used. The geometry from static objects is intersected to voxels. If the voxels are empty, a reference of the object is added to corresponding cell metadata. If the voxels are solid, a reference of the object is added to cells in the neighboring empty voxels metadata. For an empty voxel, all empty neighboring voxels are visited. If the neighboring voxel belongs to different cell, a portal is added between them. The shape of the portal is the intersection of a voxel bounding box. The CPG generator uses this metadata to add a neighboring cell into a cell group while building a cell and portal graph.

Figure 8:
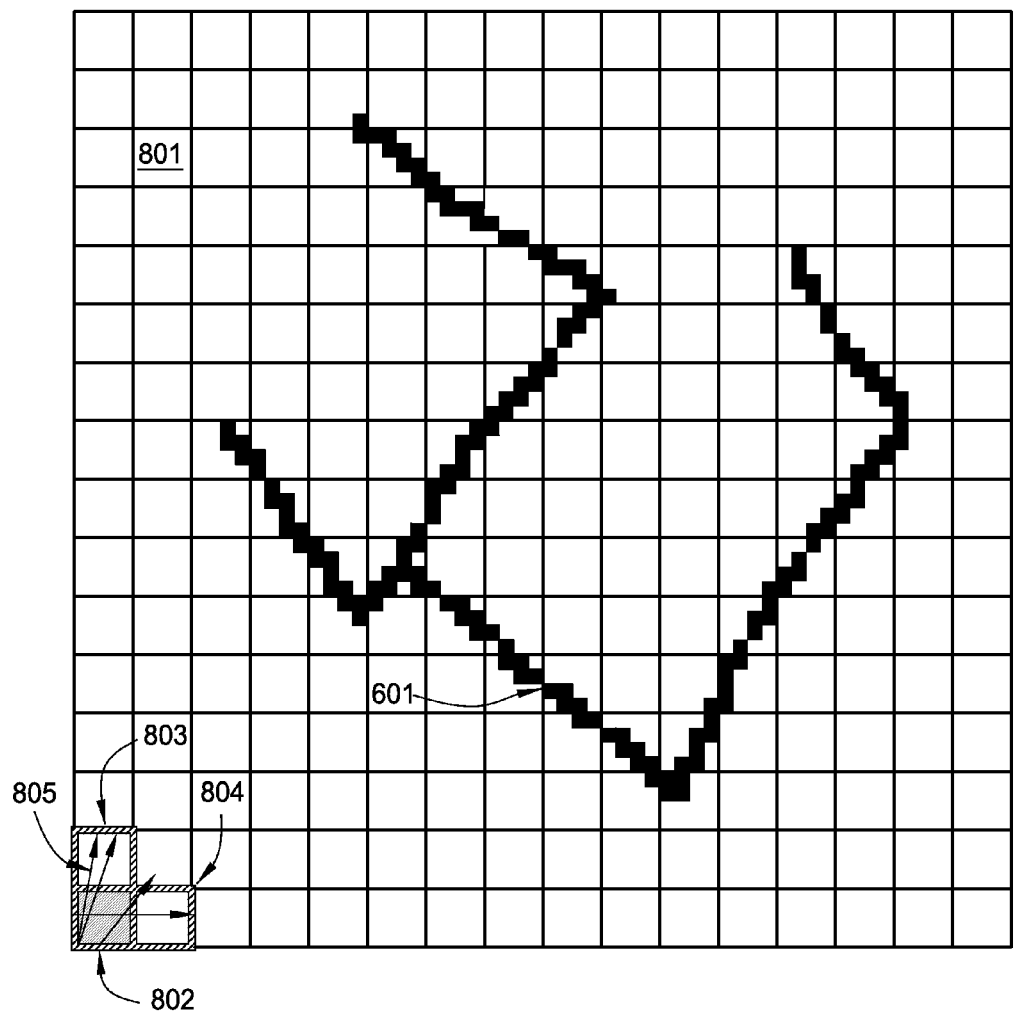
FIG. 8 illustrates ray casting for occlusion testing and initial cell grouping of nearest neighbors, according to one embodiment of the invention.

FIG. 8 illustrates ray casting 805 for occlusion testing and initial cell grouping 802 with nearest neighbors 803 and 804 for the scene 801 depicting the voxelized 2D geometry 601. As shown, initial cell grouping 802 begins by selecting an empty cell. In this step, cell grouping 802 includes only the initially selected cell—the bottom left cell in this example. A candidate set of cells 803 and 804 are empty neighboring cells. The candidate set of cells 803 and 804 are selected to test for occlusion. For example, portals between the cell group 802 and the selected candidate set of cells 803 and 804, as well as all coincident portals in the neighboring cells are ignored. Note however, no coincident portals between neighboring cells 803 and 804 are shown in FIG. 8. Random points are chosen along the portals of the candidate set of cells 803 and 804 and the cell group 802 from which rays 805 are cast to test for occlusion. In the example of FIG. 8, cell group 802 shows no ray occlusion between the portals and cells in the tests performed on the nearest neighbor cells 803 and 804. That is rays cast 805 from the points do not interest geometry 601. Therefore the nearest neighbor cells 803 and 804 are eligible to be combined into the cell group 802.

Figure 9:
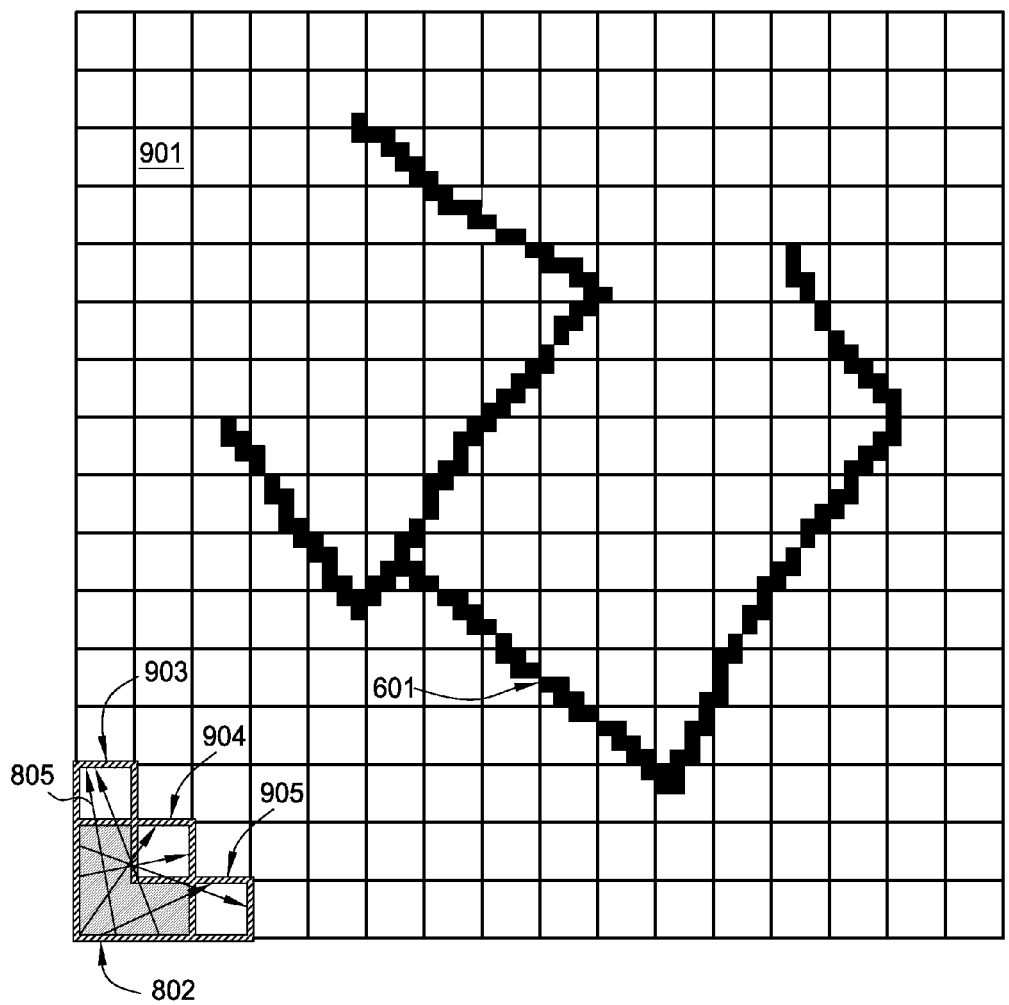
FIG. 9 further illustrates ray casting for occlusion testing and cell grouping of nearest neighbors according to one embodiment of the invention.

FIG. 9 illustrates ray casting 805 for occlusion testing and cell grouping 802. As shown, FIG. 9 includes the cell group 802, rays 805, nearest neighbors 903, 904 and 905, the scene 901, and voxelized 2D geometry 601. In this example, the cell group 802, as depicted in FIG. 8, has grown to include the neighboring cells 803 and 804 after successful testing for occlusion. Nearest empty cell neighbors to the cell group 802 are a candidate set of cells 903, 904 and 905. The portals within the cell group 802 have been removed and portals coincident with the candidate set of cells 903, 904 and 905 are ignored for the ray traversing operation. Random points are chosen along the portals of the candidate set of cells 903, 904 and 905 and the cell group 802 from which rays 805 are cast to test for occlusion between the cell group 802 and the candidate set of 903, 904 and 905. Note, however, the example of FIG. 9 does not demonstrate any ray occlusion.

Figure 10:
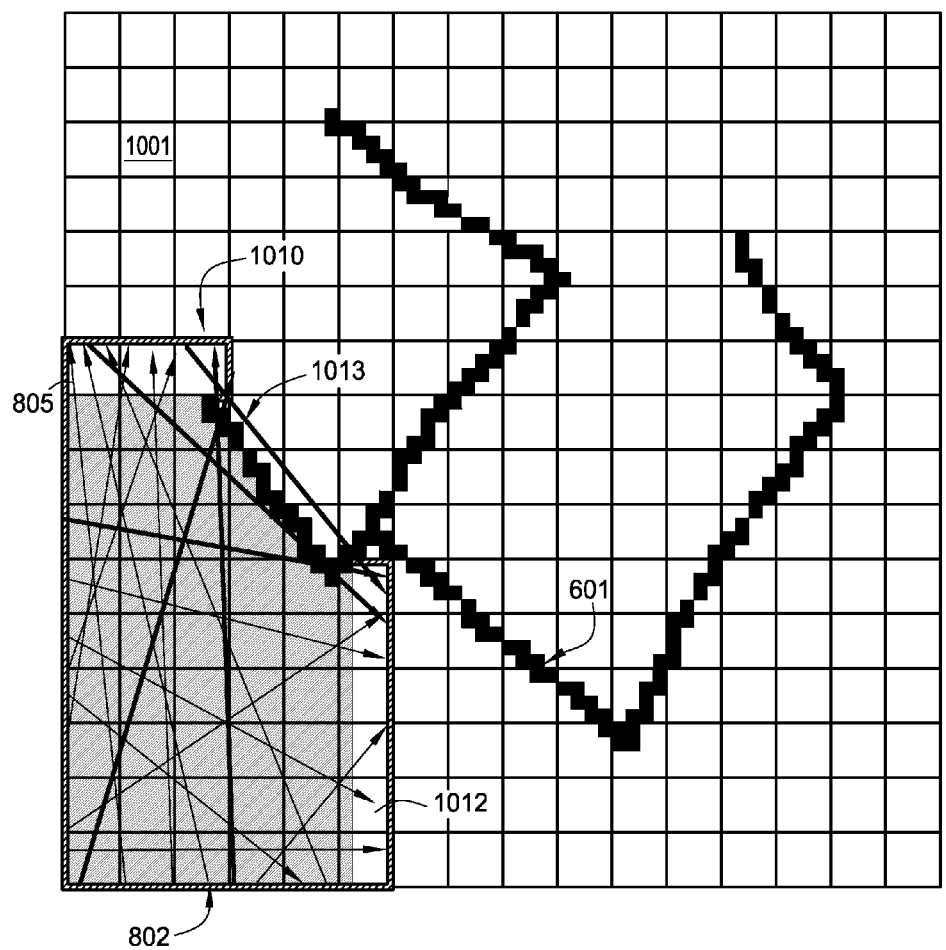
FIG. 10 illustrates occlusions that occur while casting rays in the voxelized 2D geometry, according to one embodiment of the invention.

FIG. 10 further illustrates ray casting. As shown, FIG. 9 includes rays 805, cell group 802, nearest neighbors 1010 and 1012, and voxelized 2D geometry 601. After successfully testing for occlusion, the cell group 802, as depicted in FIG. 9, has grown further to include neighboring cells 903, 904 and 905. Nearest empty cell neighbors to the cell group 802 are a candidate set of cells 1010 and 1012. The voxels representing the 2D geometry 601 are not empty cells and therefore do not qualify as a selectable nearest empty cell neighbor. There are no portals on the side of the face of the empty cell group 802 which adjoins the 2D geometry 601.

The portals within the cell group 802 have been removed and portals coincident with neighboring cells 1010 and 1012 are ignored for the ray traversing operation. Random points are chosen along the portals of the neighboring cells 1010 and 1012 and the cell group 802 from which rays 805 are casted to test for occlusion between the cell group 802 and the neighboring cells 1010 and 1012. In this example, the voxelized geometry 601 occludes some rays 1013 when traversing from some random points along the cell portals. The occluded ray 1013 is used to calculate the amount of occlusion which exists inside the candidate set of cells. A calculated occlusion value is then compared to a specified threshold to determine whether to add candidate cells 1010 and 1012 to the cell group 802. In one embodiment, the CPG generator determines whether to add the candidate neighboring cells 1010 and 1012 into the cell group 802 based on the calculated occlusion value. The neighboring cells with the calculated occlusion value under the allowed parameter are added to the cell group. The neighboring cells with the calculated occlusions exceeding the allowed parameter are rejected for that cell group.

Once the cell group 802 cannot be expanded further, a new empty ungrouped cell is selected to assign to a new group and repeat the process. The process of grouping cells and testing for occlusion continues until all cells are assigned to a group.

Figure 11:
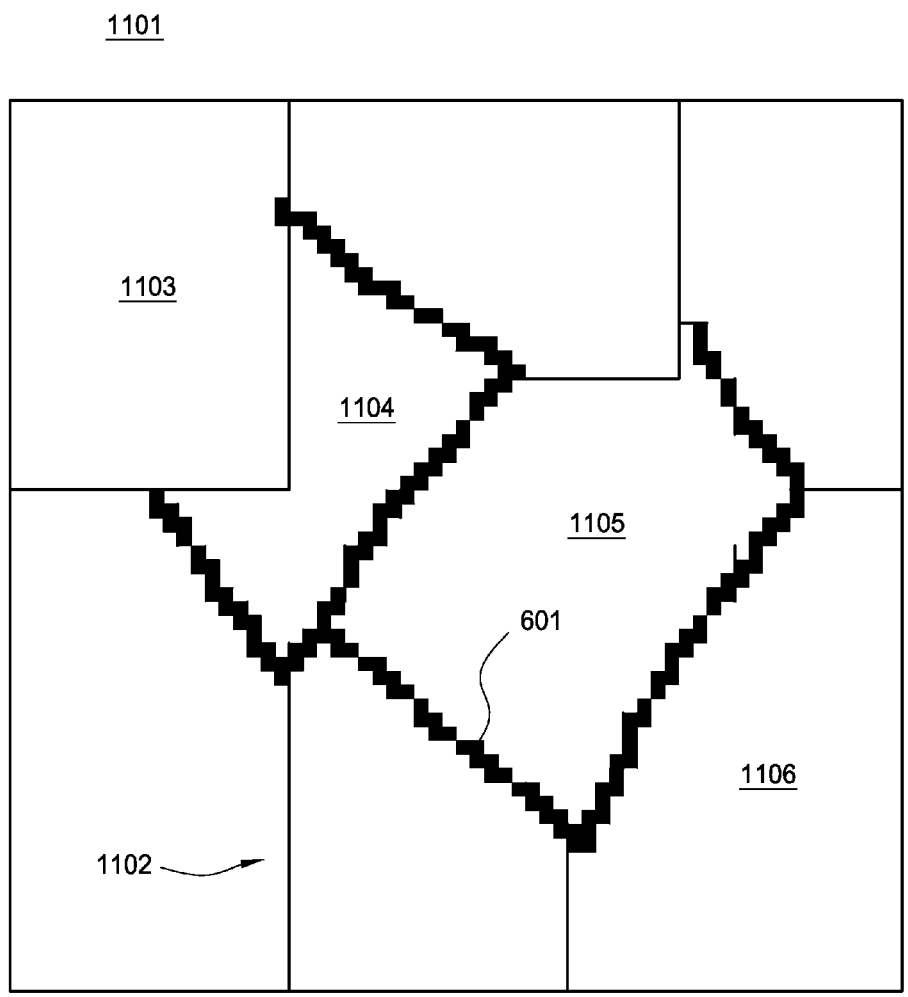
FIG. 11 illustrates voxelized 2D geometry and the portal graph generated from the cell grouping, according to one embodiment of the invention.

FIG. 11 illustrates the voxelized 2D geometry 601 and the portal graph 1102 generated from the cell grouping process. As shown, the portal graph has four regions 1103, 1104, 1105 and 1106. The portal graph 1102 represents portals that were note removed as part of the ray traversal simplification process. The portals and cell groups are stored in the cell and portal graph after the simplification method is completed. The cell and portal graph can then been used to determine visibility and occlusion culling. For example, region 1103 is visible to region 1104. However region 1106 cannot see region 1105 or 1104. For a view frustum in region 1106, the graphic rendering of region 1105 and 1104 would not occur.

Figure 12:
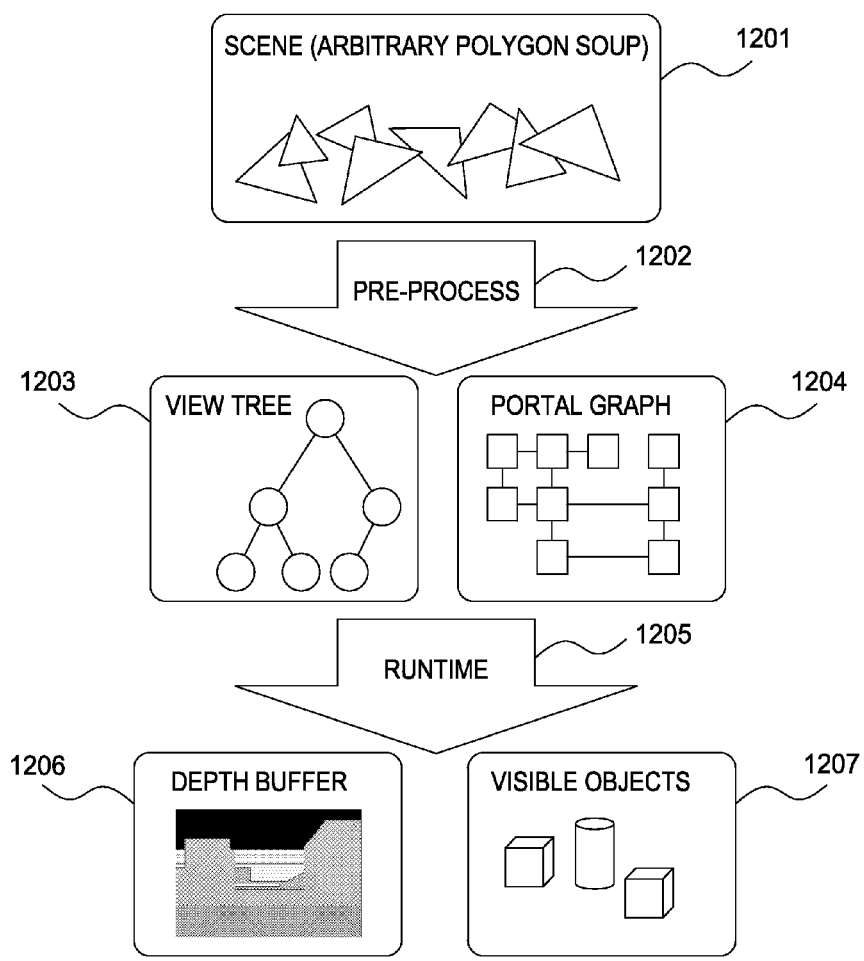
FIG. 12 illustrates a framework for rendering, according to one embodiment of the invention.

FIG. 12 illustrates how the method for generating visible a cell and portal graph scene geometry 1201 fits into a larger framework for rendering visible objects 1207. AS shown, scene geometry 1201, includes of an arbitrary polygon soup, is preprocessed at 1202 to generate a portal graph 1204 and a view tree 1203.

Finding a cell for a point in the cell and portal graph 1204 is done with a complimentary data structure. This data structure is a view tree 1203. The final cells formed by division into connected voxel groups, and subsequent cell grouping, are no longer easily captured by simple geometric shapes, and storing the complete voxel structure of even a small scene is impractical. To use the portals graph 1204 for runtime culling, the view tree 1203 is used to accurately locate the cells corresponding to the camera position in the graph.

The view tree 1203 is built by transforming voxelized representations into a median-split k-d (k-dimensional) tree. Inner nodes in the k-d tree contain a splitting axis and leaf nodes contain a reference to a cell in the cell and portal graph. The k-d tree is simplified by first optimizing the inner nodes (the splitting axes) and then collapsing the sibling leaf nodes (the cells) that refer to the same cell group. The splitting axes are optimized by recursively testing if the inner node's children are the same. If the inner node's children are the same, the splitting axis is swapped between the inner node and the children's inner nodes. The camera is not allowed to be located arbitrarily close to geometry. This ensures that the near clipping plane cannot intersect geometry, as that may cause unwanted rendering results. Therefore, neighboring solid voxels and even empty voxels, belonging to separate cells, can be collapsed as long as the size of the resulting element does not exceed the camera collision radius. Voxel groups residing in volumes are identified and simplified where the camera is not allowed to be in. This includes cells formed inside walls and below the terrain.

A runtime component 1205 generates the visible objects 1207 and rasterizes a software depth buffer 1206 that is used to test visibility. In 3D coordinate space, the depth buffer 1206 is used to determine the order of visible objects 1207 in a view frustum. The runtime component 1205 generates the values used to populate the depth buffer 1206. The operations result in a fast conservative culling while utilizing limited memory.

The cell and portal graph is automatically generated by the CPG generator. Traditional portal culling algorithms recursively traverse the graph while clipping the view frustum to the portals entered. This kind of traversal, however, visits each cell once for every visible path leading into it. In the worst case, this can lead to exponential algorithm running time and to poor performance. To limit the amount of cell re-entrance, the runtime culling algorithm traverses the graph in a mostly breadth-first fashion. Instead of a geometric portal solver, software rasterization is used to gather the visibility information into a screen-space occlusion buffer. This method almost completely eliminates excessive recursion.

Un-simplified, high resolution voxelization can consume gigabytes of memory. The consumption of large amounts of memory is avoided by dividing the world into spatial computation units, tiles, which can be computed independently from each other. The world can then be computed tile by tile in a parallel or distributed fashion. Only the currently processed set of tiles requires memory for high resolution voxel representation.

As the portal generation process is deterministic, computation results for a tile can also be stored by hashed input. This approach supports incremental changes, where only the updated part of a scene needs to be recomputed. The results can also be shared over the network. At runtime, the visibility data can be streamed by tile.

In one embodiment, the portal rectangles are rasterized into a low-resolution, 1-bit per sample, coverage buffer. Each bit in the buffer represents an un-occluded path between the cells. The transformed portals allow easy conservative handling of geometry edges with low memory overhead.

The method as disclosed takes as input 3D geometry defined as an arbitrary triangle soup and produces a data structure that can be used to efficiently reconstruct conservative occlusion information corresponding to the original triangles. The size of the output can be controlled with a parameter that simplifies the data structure in a manner that always produces conservatively correct results. For example, an input set of triangles that takes gigabytes of memory can be transformed into a data structure of a just a few megabytes which can be used to reconstruct conservatively correct occlusion information in an output format such as a z-buffer. In another example, a z-buffer reconstruction speed can be orders of magnitude faster from our data structure than from the original triangles. Speed and memory savings are gained by conservative occlusion simplification. No other method exists which can simplify arbitrary 3D geometry while retaining occlusion properties in a conservative and controllable manner.

While the forgoing is directed to embodiments of the present invention, other and further embodiments of the invention may be devised without departing from the basic scope thereof. For example, aspects of the present invention may be implemented in hardware or software or in a combination of hardware and software.

In view of the foregoing, the scope of the present disclosure is determined by the claims that follow.

We claim:

1. A computer implemented method for generating a cell and portal graph corresponding to graphics data, the method comprising:
    voxelizing the graphics data;
    generating an initial cell and portal graph for the voxelized graphics data; and simplifying the initial cell and portal graph by repeatedly:
        selecting a first cell in the initial cell and portal graph, and
        growing the first cell in the initial cell and portal graph by merging cells neighboring the first cell until the first cell cannot be grown further without exceeding a specified measure of occlusion, which is a fraction measuring occlusion between portals of the first cell and neighboring cell, wherein the fraction is determined as a percentage of rays occluded by a solid voxel relative to a plurality of rays measuring occlusion between portals of the first cell and the neighboring cell.

2. The method of claim 1, wherein voxels that do not intersect geometry in the graphics data are marked as empty and voxels that intersect geometry in the graphics data are marked as solid.

3. The method of claim 2, wherein generating the initial cell and portal graph comprises:
   identifying an initial plurality of cells by flood-filling empty voxels in the voxelized graphics data to group neighboring voxels together up to an initial cell size parameter; and
   identifying portals between the initial plurality of cells by testing whether voxels assigned to one cell in the initial plurality of cells have a neighbor voxel assigned to another cell in the initial plurality of cells.

4. The method of claim 1, further comprising:
   upon determining the percentage of occluded rays is below the specified measure of occlusion, merging the first cell and the cell neighboring the first cell.

5. The method of claim 1, wherein a voxel size is specified by a smallest hole parameter.

6. The method of claim 1, wherein the graphics data comprises one of two-dimensional (2D) and three-dimensional (3D) scene geometry.

7. The method of claim 1, further comprising:
   passing the graphics data and the simplified cell and portal graph to a rendering engine, wherein the rendering engine is configured to perform occlusion culling based on the simplified cell and portal graph when rendering images of the graphics data.

8. A non-transitory computer-readable storage medium storing code for execution by a processor, wherein the code, when executed, performs an operation for generating a cell and portal graph corresponding to graphics data, the operation comprising:
   voxelizing the graphics data;
   generating an initial cell and portal graph for the voxelized graphics data; and simplifying the initial cell and portal graph by repeatedly:
   selecting a first cell in the initial cell and portal graph, and
   growing the first cell in the initial cell and portal graph by merging cells neighboring the first cell until the first cell cannot be grown further without exceeding a specified measure of occlusion, which is a fraction measuring occlusion between portals of the first cell and neighboring cell, wherein the fraction is determined as a percentage of rays occluded by a solid voxel relative to a plurality of rays measuring occlusion between portals of the first cell and the neighboring cell.

9. The computer-readable storage medium of claim 8, wherein voxels that do not intersect geometry in the graphics data are marked as empty and voxels that intersect geometry in the graphics data are marked as solid.

10. The computer-readable storage medium of claim 9, wherein generating the initial cell and portal graph comprises:
    identifying an initial plurality of cells by flood-filling empty voxels in the voxelized graphics data to group neighboring voxels together up to an initial cell size parameter; and
    identifying portals between the initial plurality of cells by testing whether voxels assigned to one cell in the initial plurality of cells have a neighbor voxel assigned to another cell in the initial plurality of cells.

11. The computer-readable storage medium of claim 8, wherein the operations further comprise:
    upon determining the percentage of occluded rays is below the specified measure of occlusion, merging the first cell and the cell neighboring the first cell.

12. The computer-readable storage medium of claim 8, wherein a voxel size is specified by a smallest hole parameter.

13. The computer-readable storage medium of claim 8, wherein the graphics data comprises one of two-dimensional (2D) and three-dimensional (3D) scene geometry.

14. The computer-readable storage medium of claim 8, wherein the operations further comprise:
    passing the graphics data and the simplified cell and portal graph to a rendering engine, wherein the rendering engine is configured to perform occlusion culling based on the simplified cell and portal graph when rendering images of the graphics data.

15. A system, comprising:
    a memory; and
    a processor storing a game platform application, which, when executed on the processor, perform an operation for generating a cell and portal graph corresponding to graphics data, the operation comprising:
    voxelizing the graphics data,
    generating an initial cell and portal graph for the voxelized graphics data, and
    simplifying the initial cell and portal graph by repeatedly,
    selecting a first cell in the initial cell and portal graph; and
    growing the first cell in the initial cell and portal graph by merging cells neighboring the first cell until the first cell cannot be grown further without exceeding a specified measure of occlusion, which is a fraction measuring occlusion between portals of the first cell and neighboring cell, wherein the fraction is determined as a percentage of rays occluded by a solid voxel relative to a plurality of rays measuring occlusion between portals of the first cell and the neighboring cell.

16. The system of claim 15, wherein voxels that do not intersect geometry in the graphics data are marked as empty and voxels that intersect geometry in the graphics data are marked as solid.

17. The system of claim 16, wherein generating the initial cell and portal graph comprises:
    identifying an initial plurality of cells by flood-filling empty voxels in the voxelized graphics data to group neighboring voxels together up to an initial cell size parameter; and
    identifying portals between the initial plurality of cells by testing whether voxels assigned to one cell in the initial plurality of cells have a neighbor voxel assigned to another cell in the initial plurality of cells.

18. The system of claim 15, wherein the operations further comprise:
    upon determining the percentage of occluded rays is below the specified measure of occlusion, merging the first cell and the cell neighboring the first cell.

19. The system of claim 15, wherein a voxel size is specified by a smallest hole parameter.

20. The system of claim 15, wherein the graphics data comprises one of two-dimensional (2D) and three-dimensional (3D) scene geometry.

21. The system of claim 15, wherein the operations further comprise:
    passing the graphics data and the simplified cell and portal graph to a rendering engine, wherein the rendering engine is configured to perform occlusion culling based on the simplified cell and portal graph when rendering images of the graphics data.

* * * * *